United States Patent [19]
Grove

[11] 3,765,517
[45] Oct. 16, 1973

[54] ELECTRIC BRAKE ARMATURE

[76] Inventor: Leroy King Grove, 16878 Londonberry Ln., South Bend, Ind.

[22] Filed: Oct. 12, 1971

[21] Appl. No.: 188,346

[52] U.S. Cl. ............................. 188/138, 188/218 R
[51] Int. Cl. ........................................... F16d 65/34
[58] Field of Search .............. 188/138, 171, 218 R, 188/218 XL, 251 R, 251 A

[56] References Cited
UNITED STATES PATENTS

| | | | |
|---|---|---|---|
| 2,024,847 | 12/1935 | Chambers | 188/138 |
| 2,122,405 | 7/1938 | Bockius et al. | 188/251 R |
| 2,288,438 | 6/1942 | Dach | 188/218 R |
| 2,481,028 | 9/1949 | Lear | 188/218 XL X |
| 2,554,548 | 5/1951 | Albagnac | 188/251 R |

Primary Examiner—Duane A. Reger
Attorney—Marmaduke A. Hobbs et al.

[57] ABSTRACT

An electric brake mechanism having a drum, a pair of brake shoes, an actuating arm for the shoes, and an electro-magnet on the arm, in which the armature on the drum contains alternate lands and recesses in the surface thereof, to permit the magnet to dissipate surface friction heat by interrupting frictional contact and to produce a wiping action on the face of the magnet to remove particles of metal and other material which might otherwise create hard spots on the magnet surface capable of causing damage to the armature and ultimately brake failure. The recesses are preferably grooves arranged in a spiral configuration of a constantly increasing radius. The recesses may be filled with an abrasive-impregnated material, such as an epoxy, for maximizing braking performance and reliability. The drum and armature may be cast integrally with one another and the recesses either machined or cast in the surface of the armature.

12 Claims, 6 Drawing Figures

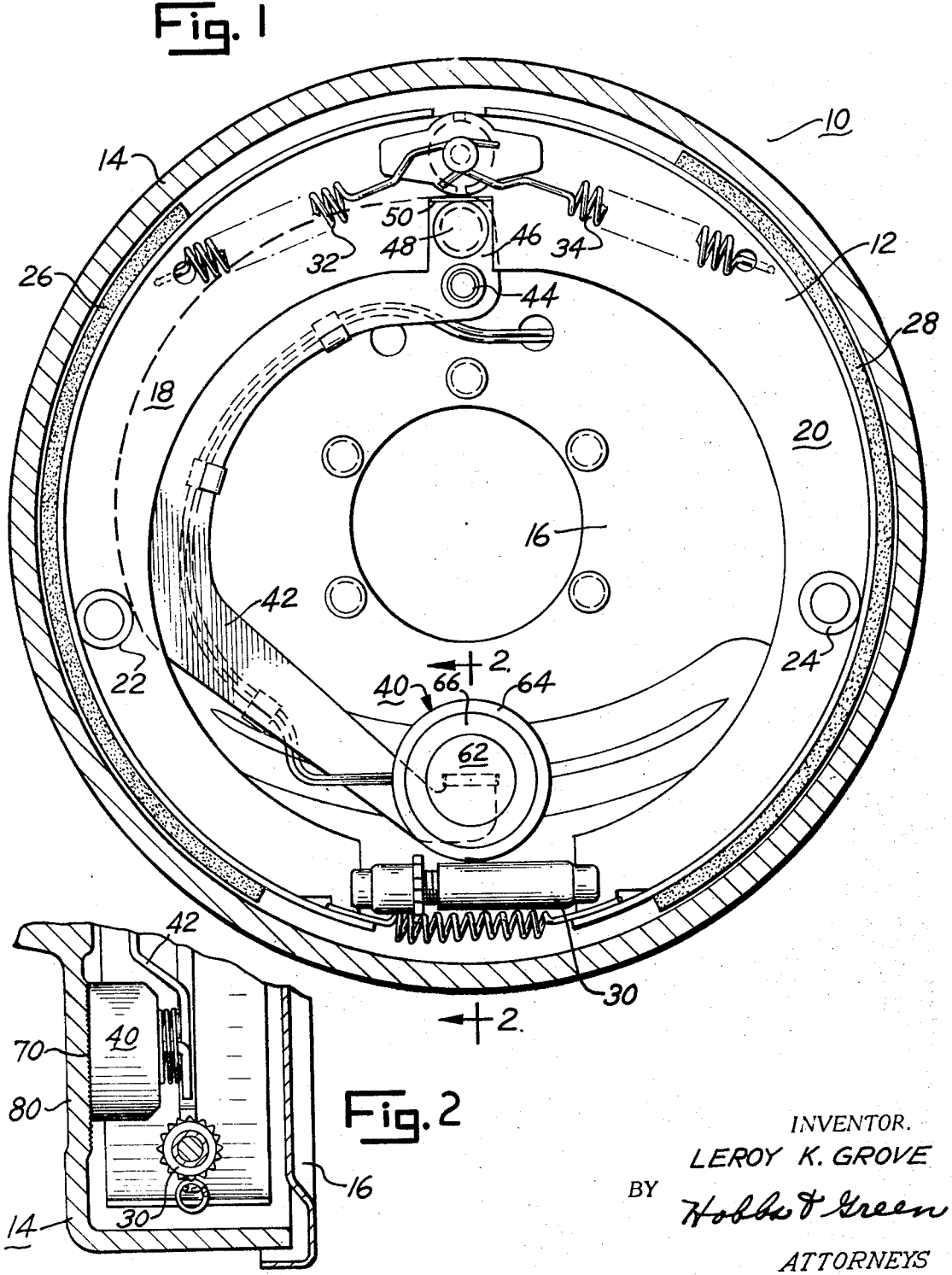

PATENTED OCT 16 1973
3,765,517
SHEET 2 OF 2
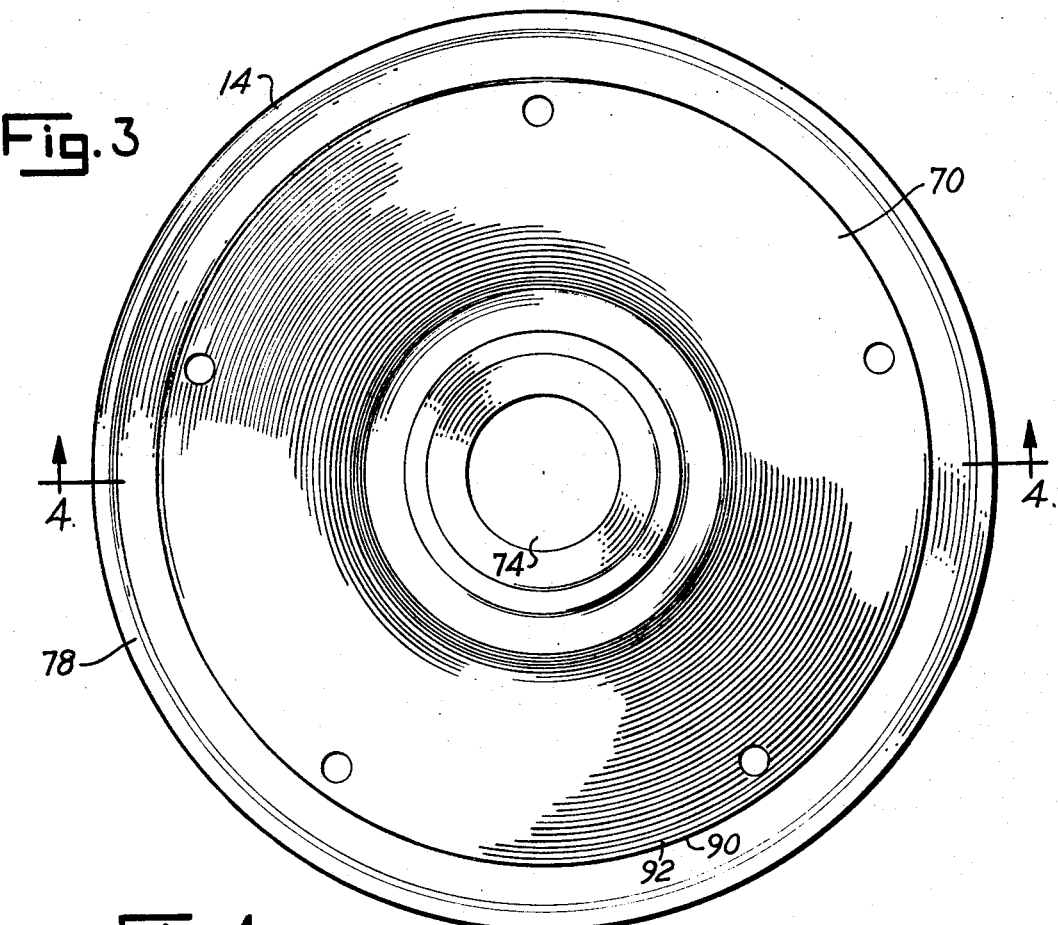
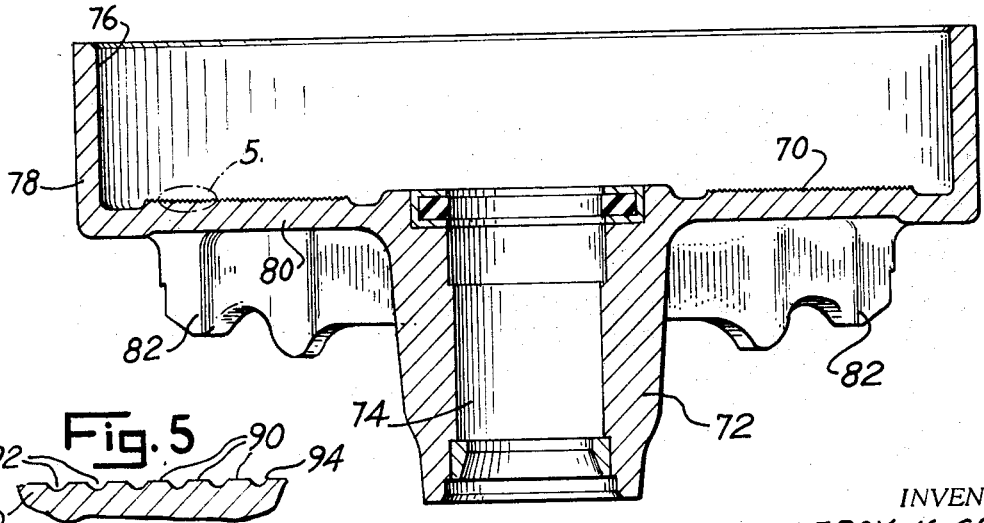
INVENTOR.
LEROY K. GROVE
BY Hobbs & Green
ATTORNEYS

ELECTRIC BRAKE ARMATURE

In a conventional, hydraulically actuated brake, a pair of brake shoes are pivotally secured to a stationary brake back-up plate and are moved into contact with a brake drum by the actuation of a piston in a hydraulic brake cylinder responsive to fluid pressure applied to the brake cylinder. In an electrically actuated system, the brake shoes are moved by means responsive to an electrical current, such a system being exemplified by the U.S. Pat. to William F. Penrose, No. 2,273,065. In these electrically operative systems a lever arm is pivotally secured to the brake back-up plate such that rotation of the lever arm causes movement of the brake shoes into contact with the brake drum. At the end of the lever arm is secured an electromagnet which is usually maintained in sliding contact with an armature plate which is secured to and moves with the brake drum. In a one piece cast iron drum and hub assembly, the face of the drum may serve as the armature plate. When the electromagnet is energized, it is magnetically attracted to the rotating armature plate, and, due to the friction between these two metal parts so attracted, a force is imposed on the magnet tending to move it in the direction of movement of the armature. This force is in turn transmitted by the lever arm to actuate the brake shoes into braking engagement with a brake drum.

It has been the practice to provide an electromagnet construction in which the metal pole faces of the electromagnet would, when energized, be forcibly held in direct metal-to-metal contact with the rotating armature with sufficient magnetic attraction to provide the necessary friction to actuate the brake shoes to the degree required for braking purposes. The surface of the frictional face of the electromagnet between the metal pole faces usually consists of a frictional material or an abrasive-filled eopxy to improve the frictional characteristics. The face of the electromagnet and the face of the armature are made as smooth and flat as possible to provide maximum magnetic attraction and frictional contact area. In the operation of this conventional electric brake, particularly at higher speeds and longer braking engagements, the metal-to-metal friction produces extreme heat at the metal face of the magnet. The armature, because of its much larger area, easily dissipates the frictional heat generated at its surface. When the frictional heat generated at the face of the magnet sufficiently exceeds the capability of the magnet housing to absorb and dissipate the heat, the metal at the most vulnerable portion of the magnet face softens, smears across the face of the magnet, and absorbs or picks up loose particles of metal from the armature. The smearing and metal pickup raise these localized areas above the rest of the magnet face to focus the friction and heat on these areas to increase and sustain this smearing and metal pickup. Not unlike friction welding, extremely hard, high spots of fused metal are formed on localized areas of the magnet face which, after cooling sufficiently to resolidify, will gouge, score, and tear the face of the armature. Once started, this destructive action proceeds rapidly, and the magnet loses its power to actuate the brake. It is therefore one of the principal objects of this invention to provide a more compatible frictional surface relationship between the rotating armature and the metal-to-metal frictional type electromagnet in order to attain an improved and consistently reliable braking performance.

In order to obtain the object of an improved and consistently reliable braking performance, it is necessary to provide a more compatible frictional relationship between the rotating armature and the electromagnet. In the present invention, this is accomplished by creating a surface configuration on the face of the armature which is not flat and smooth, as in the current practice, but which is intermittently flat and recessed to provide many intermittent frictional contacts on the face of the magnet. Since the armature has a surface area many times larger than the magnet, very minimal wear occurs at the face of the armature. This permits the recesses in the armature to be shallow enough to avoid any undesirable loss of magnetic attraction. The relative widths of the armature flat frictional contact areas and the adjoining recesses can be controlled to provide a sufficient proportion of the magnet face area in continuous frictional contact with the armature to produce the required frictional braking force, to provide an interruption of frictional contact at all points of the magnet face often enough to permit the magnet housing to absorb and dissipate sufficient surface heat to prevent any point or portion of the magnet face from becoming hot enough to soften, smear, and pick up metal particles, and to provide a continuous wiping and cleaning action of the flats or lands and recesses of the armature on the magnet face to minimize or eliminate the presence of loose metal particles between the two frictional surfaces.

One simple, effective, and inexpensive configuration of lands and recesses can be obtained by facing the armature flat on a lathe or other machine tool, then, using a relatively fast feed per revolution, face cut a continuous groove or recess approximately one half as wide as the feed rate. This leaves a flat area approximately as wide as the adjoining groove or recess. Therefore, with about the same effort as is required to rough and finish face the armature for a smooth face, one can achieve a recess and flat configuration in which the recesses and adjoining flats are continuously circling the centerline or bore of the drum on an ever-increasing radius of a spiral configuration similar to the grooves on the face of a phonograph record. In the operation of a brake of the foregoing construction, when the magnet is energized, it moves with the drum to the extent required to expand the brake shoes into braking position, and remains relatively stationary at this point. The armature is rotating concentrically about the bore or spindle bearing, whereas the lands and recesses of the armature face in contact with the magnet are constantly moving out toward the periphery or in toward the hub, depending on the direction of the armature, so long as relative rotation continues between the armature and magnet. This fulfills the above criteria for a compatible frictional relationship between the rotating armature and the electromagnet.

Another effective method of obtaining the desired recess and land relationship on the face of a cast iron drum armature involves no alteration of the standard machining practice. The desired recesses of any predetermined size or geometrical pattern are cast in the armature face of the drum sufficiently deep that they remain in the armature face of the drum after it is finish machined.

In either of the two described procedures of producing the armature, if greater braking performance and reliability are desired, the recesses of the armature face can be filled with an abrasive-filled epoxy or similarly acting material to improve the frictional characteristics, as will be more fully explained hereinafter.

The present invention will be more fully understood from the detailed description of one specific embodiment of the invention, with reference to the accompanying drawings, wherein:

FIG. 1 is an elevational view of a backing plate, brake shoes and operating mechanism of the type which may be used in combination with my armature and drum, the latter part being shown in transverse cross section;

FIG. 2 is an enlarged, fragmentary partial cross sectional and elevational view of the brake assembly shown in FIG. 1, the section being taken on line 2—2 of the latter figure;

FIG. 3 is an elevational view of a brake drum embodying my improved armature shown in elevation;

FIG. 4 is an axial cross-sectional view of the drum and armature shown in FIG. 3, the section being taken on line 4—4 of the latter figure;

FIG. 5 is an enlarged, fragmentary cross-sectional view of my armature, the locale of the section being indicated by the circle of numeral 5; and FIG. 6 is a cross-sectional view similar to the view shown in FIG. 5, illustrating a modified form of the present invention.

Referring more specifically to the drawings and FIG. 1 in particular, numeral 10 indicates generally the brake assembly, including a brake operating mechanism 12 and a brake drum 14 which is attached to and normally forms a part of the wheel structure of the vehicle in which the brake is used. The brake assembly includes a backing plate 16 on which brake shoes 18 and 20 are pivotally mounted and movably secured thereto or restrained by spring-loaded retaining pin assemblies 22 and 24, respectively. The brake shoes contain friction material 26 and 28 bonded to the external surface of the brake shoes, and engage the internal surface of drum 14 when the brake is applied. An adjustment screw 30 interconnects the brake shoes which are yieldably retained in their retracted position from the brake drum by springs 32 and 34.

The brake actuating mechanism for applying brake shoes 18 and 20 into braking engagement with the drum consists of an electromagnet 40, a lever 42 connected at one end to the magnet and pivotally mounted on a pin 44, which in turn is secured to backing plate 16. Lever 42 swings on pin 44 and is curved in an offset manner to pass around the drum axis and to position the electromagnet at a point 180° from pin 44. Arm 42 includes an extension or short arm 46 carrying a pin 48 on a swivel block 50, which bears against the adjacent ends of the brake shoes. The magnet is operated in conjunction with an armature, fully described hereinafter, connected directly to brake drum 15 on a plane parallel with backing plate 16. The magnet 40 faces the armature and is adapted to frictionally engage the face thereof when energized.

With the armature and the brake drum 14 rotating in a counterclockwise direction, electromagnet 40, when energized, will be moved to the right, thereby moving pin 48 to the left so that it pushes against the end of brake shoe 18 to move the shoe outwardly into braking engagement with the internal surface of drum 14. The engagement of the brake shoe 18 with the drum in turn develops a self-energizing force on shoe 18, which is transmitted through screw 30 to brake shoe 20 to cause the latter shoe to move into braking engagement with the internal surface of drum 14. With the rotation of the armature plate and brake drum in the clockwise direction, the action just described is performed in reverse with the electromagnet moving to the left to cause pin 48 to engage the adjacent end of the brake shoe 20 which in turn, through screw 30, actuates brake shoe 18. When the electromagnet is released or deenergized, the two springs 32 and 34 disengage the brake shoes from the drum, returning them and the electromagnet to the position illustrated in FIG. 1.

Electromagnet 40, which may be considered conventional for the purpose of the present description, consists of a ferrous metal body having an inner pole 62 and outer pole 64 and electrical coil 66 disposed around inner pole 62. The magnet is secured to the end of actuating arm 42 and the face of the magnet contacts the armature with sufficient attraction when energized to cause arm 42 to move the brake shoes into engagement with the brake drum.

In the embodiment of the invention illustrated in the drawings, the armature 70 for magnet 40 is preferably cast as an integral part of cast iron brake drum 14 which, except for the armature, is conventional in construction and operation, consisting of a hub 72 having a center bore 74 for receiving an axle of the vehicle, and five threaded holes for receiving bolts for securing a wheel to the drum. The braking surface 76 is on the inner side of peripheral portion 78 which is connected to the hub by radial wall 80 and a plurality of radial ribs 82 in which the holes for the wheel securing bolts are located.

The armature 70, which is formed as an integral part of drum 14 and which is on the inner surface of radial wall 80, is provided with intermittent or alternate lands or flats 90 and intervening recesses or grooves 92, the preferred size and shape of the lands and grooves being best seen in FIG. 5. While the series of grooves 92 reduces the area of the armature contacted by the face of the electromagnet 40, the wear which may occur on the face of the armature is minimal in that the surfce area is much larger than the contact area of the magnet. As seen in FIG. 5, grooves 92 are relatively shallow and do not significantly diminish the magnetic attraction between the armature and magnet when the latter is energized during a braking operation. The flats or lands 90 are on a common plane and preferably meet with the intervening grooves at a distinct angle 94 to provide optimum wiping action on the surface of the magnet, as will be more fully described hereinafter. The lands 90 provide sufficient frictional contact for the magnet to generate the required brake force when the magnet is energized and to permit the armature to adequately dissipate the heat resulting from the friction between the armature and energized magnet.

While various alternate land and recess configurations may be employed to obtain a continuous wiping and cleaning action for removing and eliminating loose metal particles from the surface of the magnet, the preferred geometrical design or surface configuration of the armature face consists of a spiral land and groove structure similar to that on the surface of a phonograph record. With this configuration, lands 90 and grooves 92, in effect, continuously move outwardly or inwardly as the armature rotates relative to the magnet, the movement outward or inward depending upon the direction of the spiral and the direction of rotation of the armature. Preferably, the land and groove spiral is in the direction which will result in a wiping action across the face of the magnet radially outwardly when the vehicle is moving in the forward direction. The spiral configuration is illustrated in FIGS. 3 and 4 and the spacing of the lands and grooves is preferably uniform from one edge of the armature face to the other. The interruption of the frictional contact by the grooves assists in dissipating excess heat. The radial width of the land and groove containing portion of the armature should be greater than the face of the magnet contacting the portion, and would normally extend over the entire surface of the armature.

Other flat and recess configurations which may be used are, for example, alternate radial or tangential lands and grooves of a straight or arcuate shape, and circular lands and grooves ecceentrically positioned with respect to the axis of the armature and drum. The former configuration produces an outwardly or inwardly wiping action on the face of the magnet while the latter configuration produces an alternate outwardly and inwardly wiping action, i.e., a constant reversing wiping action.

In the operation of the electric brake utilizing my armature, when magnet 40 is energized, it is attracted firmly against armature 70, producing a strong frictional contact therewith thus causing actuation of arm 42, which in turn actuates the brake shoes 18 and 20, as previously described herein. During this operation, the lands and recesses are passing continuously over the face of the magnet, constantly removing any loose metal particles or abrasive material which might otherwise adhere to the magnet and cause localized raised areas of hard material capable of producing rapid wear and deterioration of the brake armature, and ultimately causing brake failure.

The grooves may be machined into the armature at the time the armature lands are faced, or they may be cast in the drum and the lands thereafter faced by machining. Further, the armature of my land and recess configuration may, if desired, be made as a separate element and secured to the radial wall of the brake drum.

A modified drum of the invention is illustrated in FIG. 6. In this form the frictional surface of the armature may be improved, if required, without appreciably diminishing effective wiping action, by filling the recesses with an abrasive-impregnated epoxy or similar material 96 in grooves 92'. The grooves and lands in armature 70' are the same as in the previously described embodiment, and may be produced in the same manner, with the exception that the lands may be machined after the filler material 96 has been added to the grooves.

While several embodiments or modifications of my electric brake armature have been described in detail herein, other modifications and further changes may be made without departing from the scope of the invention.

I claim:

1. In an electric brake having a brake drum, a pair of brake shoes, an actuating arm for said shoes and an electromagnet attached to said arm: an armature for said magnet, comprising a magnetic attractable disc shaped metal body coaxially disposed with respect to said drum and having lands on the annular surface engaged by the magnet and recesses between said lands for interrupting the point of frictional contact between the magnet and armature.

2. An armature for an electric brake as defined in claim 1 in which said recesses are grooves forming a spiral configuration of a constantly increasing radius throughout said annular surface engaged by the magnet.

3. An armature for an electric brake as defined in claim 1 in which said armature is cast as an integral part of said brake drum and said lands and recesses are machined on the annular surface contacted by the magnet.

4. An armature for an electric brake as defined in claim 2 in which said armature is cast as an integral part of said brake drum and said lands and recesses are machined on the annular surface contacted by the magnet.

5. An armature for an electric brake as defined in claim 1 in which said recesses contain an abrasive-impregnated material adhering firmly to said body in said recesses.

6. An armature for an electric brake as defined in claim 5 in which said material consists of an epoxy.

7. An armature for an electric brake as defined in claim 2 in which said recesses contain an abrasive-impregnated material adhering firmly to said body in said recesses.

8. An armature for an electric brake as defined in claim 7 in which said material consists of an epoxy.

9. An armature for an electric brake as defined in claim 1 in which said drum is cast metal and said armature is an integral part of said drum and contains spaced recesses cast in the face of the armature contacted by said magnet.

10. An armature for an electric brake as defined in claim 9 in which said recesses form a spiral configuration of constantly increasing radius.

11. An armature for an electric brake as defined in claim 9 in which said grooves contain an abrasive-impregnated material adhering firmly to said body in said recesses.

12. An armature for an electric brake as defined in claim 11 in which said material consists of an epoxy.

* * * * *